INVENTORS
NORMAN A. JULL
HERBERT A. McCRACKEN
JAMES C. L. GRAHAM

BY *Cavanagh & Norman*

United States Patent Office 3,509,900
Patented May 5, 1970

---

3,509,900
LARGE BALL CHECK VALVES
Norman A. Jull, Toronto, Ontario, Herbert A. McCracken, Brampton, Ontario, and James C. L. Graham, Don Mills, Ontario, Canada, assignors to The Technequip Company Limited, Weston, Ontario, Canada
Filed July 7, 1968, Ser. No. 744,241
Int. Cl. G05d *11/03;* F16k *21/08;* F16l *7/00*
U.S. Cl. 137—112         5 Claims

ABSTRACT OF THE DISCLOSURE

The specification discloses relative proportions in a large ball check valve in industrial use which renders possible valve structures of effectively unlimited size having regard to circumstances where for a given increase in valve opening diameter the area increases as the square of the diameter and the ball weight increases as the cube of the diameter. The control of the resulting forces is taught.

---

This invention relates to improvements in large ball check valves of use especially in fuel pipeline transmission systems and in chemical and mining industries.

Prior ball check valve structures have been limited to uses in small sizes because the mass of the ball valve member may cause severe damage to the valve seats and the valve body internal structure. Thus prior designs call for a minimum diameter of ball relative to the valve seat whereby the seating angle of the ball, i.e. the included angle between the seat contact and centre of the ball is of the order of about 140 degrees. Therefore guide devices for the ball in such prior structures intrude into the flow passage through the valve restricting same to less than the area of the smallest of either the inlet or outlet opening.

The present invention, contrary to the prior art, adopts the disadvantages of a large ball but compensates for same generally by providing as its main object a ball of a seating angle less than 120 degrees and preferably of the order of about 90 degrees or less. Those portions of the ball beyond the area of the inlet opening and desired passage through the valve are fully supported by guide means carrying same from one operative position to another so as to avoid vibration and damage to the ball or the ball valve seats.

Other objects of the invention will be appreciated by a study of the following specification taken in conjunction with the accompanying drawings.

A valve of the invention embodies inherent proportions of its components to enable endurance under continued use. When a large ball valve is made according to the following teachings the size of the valve will be found to be unlimited by any problem arising from the mass of the ball. Considering that if a one inch ball valve is scaled up to say ten inch size, the area increases according to the square of the increase in diameter whereas the mass of the ball increases as the cube of the increase in diameter. Under the same pressure conditions within the valve the one ten times the diameter will have the ball moving under a pressure force 100 times as large and the mass of the ball will be 1000 times that of the one inch ball. Large valve construction of the invention even in sizes of 20 inches and up to 60 inches or more cannot endure successfully unless the ball is substantially fully supported and guided during its entire path of travel from one inlet opening to another.

Figure 1:
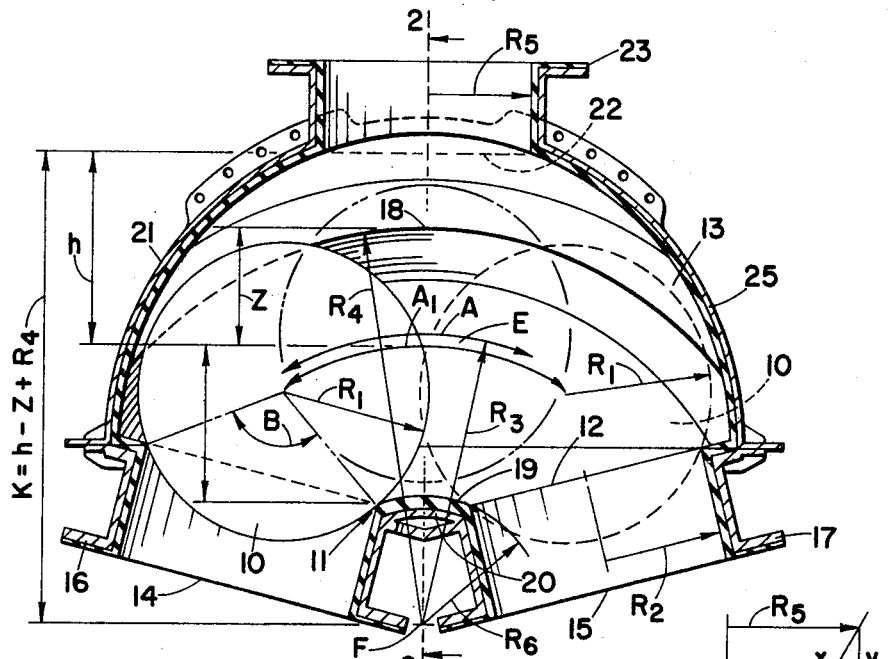
FIG. 1 is a vertical sectional view of a valve according to the invention.
Figure 2:
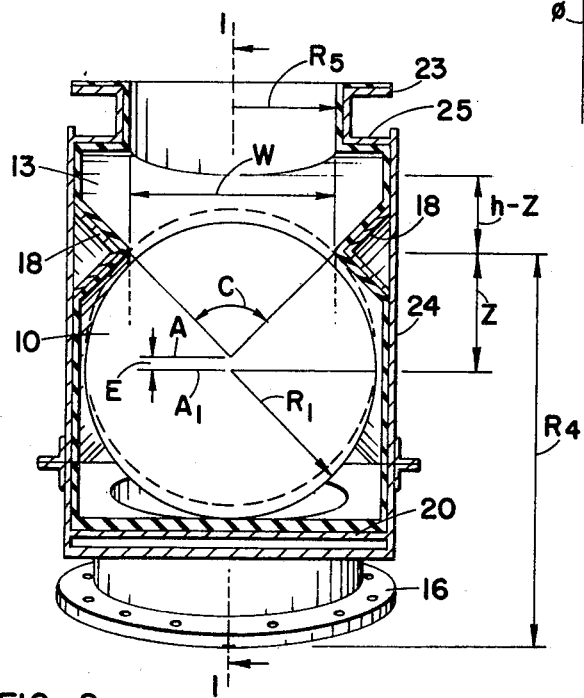
FIG. 2 is a section on the line 2—2 of FIG. 1.

In the drawings a typical valve structure of the invention is shown in FIGS. 1 and 2 wherein ball 10 of radius $R_1$ is moveable on guided substantially arcuate rolling path A or radius $R_3$ from one inlet valve seat 11 to another inlet valve seat 12 both of radius $R_2$, responsive to pressures within valve body 13 and at inlet openings 14, 15 defined by fittings 16, 17. Between the inlet openings the ball is guided by arcuate guide rails of radius $R_4$ of about 1.5 to 2 times the ball radius $R_1$ to define a path of motion A determined by the guides 18 rather than by the contact of the ball with the inner surface 19 of middle base plate or bridge 20. The radial distance E between A and $A_1$ is provided by locating the centre F of radii $R_3$, $R_4$. It is preferred to set the guide contact angle C at about 90 degrees whereby $$R_3 = R_4 - \frac{R_1}{\sqrt{2}}$$

under conditions where the clearance distance W between guides 18 is of the order of about the diameter $2R_2$ of an inlet opening in the ideal case as a minimum though it will be realized that W may be less than this value and still not restrict flow through the valve body because of generous freedom around other surfaces of the ball. Nevertheless undue turbulence is avoided by providing an unobstructed pathway through valve body 21 to outlet opening 22 of radius $R_5$ of outlet fitting 23.

The ball seating angle B is small in contrast with prior art practice being of the order preferably of between 80 to 90 degrees. In this way the valve body including supporting and guiding structure 18 for the ball may be located in all surfaces outside or beyond a flow path through the body which is uninterrupted between the inlet openings and the outlet openings save by the ball 10.

Figure 3:
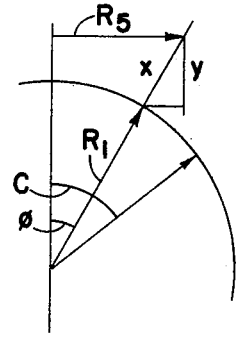
FIG. 3 is a diagram of the geometric relations of the invention.

The uppermost position of the ball 10 between guides 18 is that providing a flow opening around the ball at the outlet opening equal at least to the area of the outlet opening. Thus referring to FIG. 3 and setting Area of outlet opening = clearance area around ball to opening $$\pi R_5^2 = 2\pi R_5 y$$

Therefore $$y = \frac{R_5}{2}$$

Now $$\frac{R_5}{R_1 + x} = \sin \phi$$

Values of $x$ range from $\sqrt{2y}$ max. to about $1.2y$ min. For $\phi = 45$ degrees, $$x = \sqrt{2y} = \frac{R_5}{\sqrt{2}}$$

If $$R_1 + x = R_1 + \frac{R_5}{\sqrt{2}}$$

Then $$h^2 + R_5^2 = \left(R_1 + \frac{R_2}{\sqrt{2}}\right)^2$$

and $$h = \sqrt{R_1^2 + 2\frac{R_1 R_5}{\sqrt{2}} - \frac{R_5^2}{2}}$$

Now
$$Z = \frac{R_1}{\sqrt{2}}$$

Therefore
$$K = h - Z + R_4 = h - \frac{R_1}{\sqrt{2}} + R_4$$

In a special case of the invention $R_5 = R_1$, $R_3 = 3.34 R_1$ and $R_4 = 4.05 R_1$ for which $$h = \sqrt{2}\, R_1 \text{ approx.}$$

and $K = 4.76\, R_1$ where K is the distance from F to outlet 22

By this means the geometry of the valve derives from the plane and axis of the outlet opening from which centre of radii $R_3 R_4$ is located. Preferably the two seating positions of the ball on the inlet openings are such that the ball centres are spaced on the arc of $R_3$ a distance $2R_1$, though a greater or lesser distance will not affect operation. The base plate surface 19 then need only be within a radius $R_6$ between its centre F and the nearest point of the valve seat openings.

The provision of an arcuate guide means 18 supporting the ball to define its path of motion at substantially minimum effective clearance E establishes such path for smooth motion free of vibration and chatter. A ball of a valve of the invention may weigh many hundreds of pounds and while the foregoing geometric analysis is in part self evident once a combination of the invention is at hand too great an emphasis cannot be placed on the necessity of achieving the geometry described to obtain any real prospect of continued service in use.

The structural combination subject to the relationships described comprises an outlet fitting having an outlet radius $R_5$ defining an outlet opening plane containing the valve axis at right angles thereto. A central base plate intersects the planes of two inlet openings of radius $R_2$ equidistant from the axis and adapted to seat a ball at a small seating angle and of a radius substantially greater than that of the opening. The two inlet fittings thus extend outwardly from the base plate and side walls extend therefrom to the outlet fittings. The specific form of the side walls is not important, the term side walls in this sense being intended to embrace parallel spaced apart walls 24 and curved top walls 25 defining valve body 13. The guide rails 18 provide a curved guide path for the ball 10 on a radius of between about 2.8 and 3.3 times the radius of the ball and from a centre on the axis spaced between about 4.2 and 4.7 times the radius of the ball from the plane of the outlet opening. The range in these values permits a flatter curved larger radius for very large valves. An increase in the radius of the outlet opening to greater than that of the inlet openings to a valve $R_5 = R_1$ will improve performance in some applications.

What is claimed is:

1. A large free ball check valve comprising: a valve body defined by side walls, an outlet fitting having an outlet opening plane concentric with and at right angles to an axis of symmetry for said valve body, and inlet fittings providing inlet openings spaced equidistant from said axis by a base plate; a ball within said body of a radius substantially greater than that of the inlet openings of said inlet fittings to define a small seating angle therewith; and arcuate guide means in said body extending substantially from one inlet opening to the other of a curvature radius $R_4$ about four times the radius of the ball and centered on said axis a distance K greater than $R_4$ from said plane, said guide means contacting said ball at an included angle of about ninety degrees.

2. A ball check valve as claimed in claim 1 in which the distance between the plane of the outlet opening and the guide means at said axis is 1.4 times the radius of the ball as a minimum and not substantially greater.

3. A ball check valve as claimed in claim 1 in which the ball is fully guided in a motion path defined by said guide means of a clearance of the order of about one twentieth of the ball radius.

4. A free ball check valve comprising: a valve housing having a plurality of inlet fittings each having a valve seat opening of predetermined radius $R_2$ and an unobstructed pathway through said body to an outlet fitting having an outlet opening of radius $R_5$; a valve ball of radius $R_1$ substantially greater than $R_2$ and adapted to define a seating angle of less than about 90 degrees with said inlet fitting valve seat openings; arcuate guide means within said housing of a ball contact arc radius $R_4$ of between about $1.5R_1$ and about $2.0R_1$ being spaced apart a distance W equal to about $2R_2$ and at said radius $R_4$ being a distance Z from the arc of the ball centre when seated plus a ball clearance distance E, said outlet opening being spaced from the centre of said arm $R_4$ a distance $$K_{min.} = h - Z + R_4 \qquad \text{where } Z = \frac{R_1}{\sqrt{2}}$$

and $$h = \sqrt{R_1^2 + \frac{2 R_1 R_5}{\sqrt{2}} - \frac{R_5^2}{2}}$$

5. A ball check valve as claimed in claim 4 in which $R_5$ equals $R_1$.

References Cited

UNITED STATES PATENTS

| | | | |
|---|---|---|---|
| 315,521 | 4/1885 | Lord et al. | 137—113 |
| 1,894,603 | 1/1933 | Towne | 137—533.11 X |
| 3,195,660 | 7/1965 | McKown | 137—533.11 X |
| 3,444,881 | 5/1969 | Harper | 137—533.11 X |

FOREIGN PATENTS

| | | |
|---|---|---|
| 987,565 | 4/1951 | France. |
| 615,759 | 1/1961 | Italy. |

ALAN COHAN, Primary Examiner

D. J. ZOBKIW, Assistant Examiner

U.S. Cl. X.R.

137—533.11, 533.19

UNITED STATES PATENT OFFICE
CERTIFICATE OF CORRECTION

Patent No. 3,509,900                                  May 5, 1970

Norman A. Jull et al.

It is certified that error appears in the above identified patent and that said Letters Patent are hereby corrected as shown below:

In the heading to the drawings, line 3, and in the heading to the printed specification, line 7, "July 7, 1968", each occurrence, should read -- June 7, 1968 --. Column 2, line 11, "radius" should read -- diameter --; line 55, "$\sqrt{2y}$" should read -- $\sqrt{2}.y$ --; line 65, "$R_2$" should read -- $R_5$ --. Column 4, line 13, beginning with "A Ball" cancel all to and including "greater." in line 16, same coulmn 4 and insert -- A ball valve as claimed in claim 1 in which the nearest distance h between the ball centre and the plane of the outlet opening is $$h = \sqrt{R_1^2 + 2.R_1 R_5 - \frac{R_5^2}{2}}$$

approximately, where $R_1$ is the radius of the ball and $R_5$ is the radius of the outlet opening. --; same column 4, line 19, after "clearance" insert -- E --; line 27, cancel "less than"; line 29, cancel "of be-" line 30, "tween about $1.5R_1$ and about $2.0R_1$" should read -- greater than $R_1$ --; line 31, after "$R_4$" insert -- , said guide means --; line 32, after "the", first occurrence, insert -- motion --; same line 32, cancel "when"; line 33, cancel "seated plus a ball clearance distance E"; line 35, after "Z", first occurrence, insert -- approximately --.

Signed and sealed this 15th day of June 1971.

(SEAL)
Attest:

EDWARD M. FLETCHER, JR.                        WILLIAM E. SCHUYLER, JR.
Attesting Officer                                 Commissioner of Patents

UNITED STATES PATENT OFFICE
CERTIFICATE OF CORRECTION

Patent No. 3,509,900        Dated      May 5, 1970

Inventor(s) Jull, Norman A. et al

It is certified that error appears in the above-identified patent and that said Letters Patent are hereby corrected as shown below:

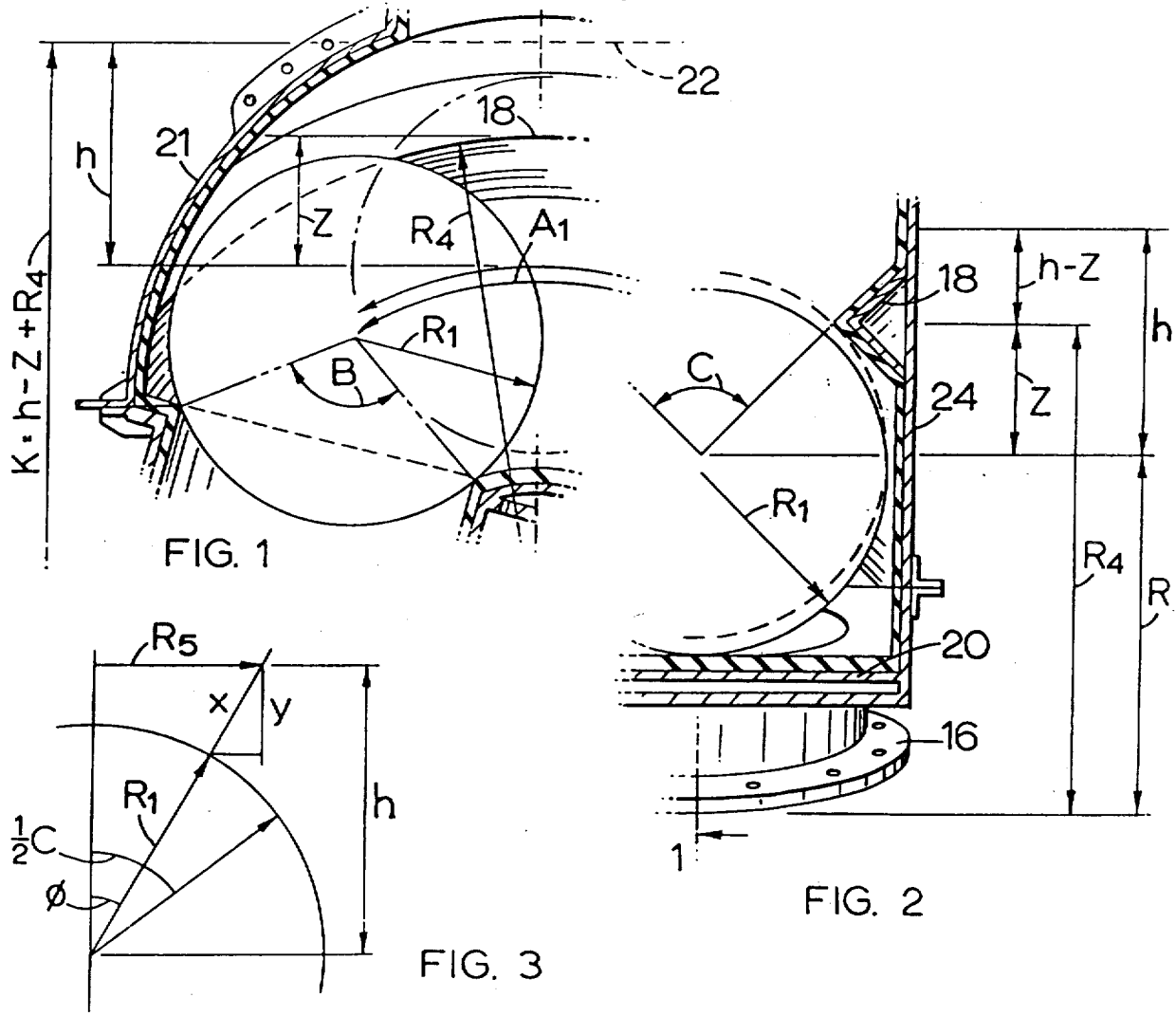

Signed and sealed this 28th day of September 1971.

EAL)
test:

WARD M. FLETCHER, JR.
testing Officer

ROBERT GOTTSCHALK
Acting Commissioner of Patents